(12) United States Patent
Matsuda et al.

(10) Patent No.: US 10,401,711 B2
(45) Date of Patent: Sep. 3, 2019

(54) MULTIDIRECTIONAL DRIVE DEVICE, AND AUTOMATIC CAMERA

(71) Applicant: NEC Embedded Products, Ltd., Tokyo (JP)

(72) Inventors: Tomomi Matsuda, Tokyo (JP); Riichiro Tadakuma, Yonezawa (JP); Hiroto Saito, Osaka (JP); Kazuki Abe, Utsunomiya (JP)

(73) Assignee: NEC Embedded Products, Ltd., Tokyo (JP)

( * ) Notice: Subject to any disclaimer, the term of this patent is extended or adjusted under 35 U.S.C. 154(b) by 0 days.

(21) Appl. No.: 15/764,019

(22) PCT Filed: Sep. 29, 2016

(86) PCT No.: PCT/JP2016/078929
§ 371 (c)(1),
(2) Date: Mar. 28, 2018

(87) PCT Pub. No.: WO2017/057635
PCT Pub. Date: Apr. 6, 2017

(65) Prior Publication Data
US 2018/0284578 A1 Oct. 4, 2018

(30) Foreign Application Priority Data

Sep. 30, 2015 (JP) .................. 2015-192976

(51) Int. Cl.
*G03B 17/56* (2006.01)
*F16H 19/04* (2006.01)
(Continued)

(52) U.S. Cl.
CPC .............. *G03B 17/561* (2013.01); *F16H 1/28* (2013.01); *F16H 19/001* (2013.01); *F16H 19/04* (2013.01);
(Continued)

(58) Field of Classification Search
USPC ......................................................... 396/428
See application file for complete search history.

(56) References Cited

U.S. PATENT DOCUMENTS

| 5,502,598 A * | 3/1996 | Kimura .................. G02B 7/023 |
| | | 348/E5.028 |
| 5,946,127 A | 8/1999 | Nagata |

(Continued)

FOREIGN PATENT DOCUMENTS

| JP | 61-228158 A | 10/1986 |
| JP | 06-109090 | 4/1994 |

(Continued)

OTHER PUBLICATIONS

International Search Report corresponding to PCT/JP2016/078929, dated Jan. 10, 2017 (4 total pages).

(Continued)

*Primary Examiner* — Clayton E. LaBalle
*Assistant Examiner* — Warren K Fenwick
(74) *Attorney, Agent, or Firm* — Wilmer Cutler Pickering Hale and Dorr LLP

(57) ABSTRACT

A multidirectional drive device includes: a driven member that comprises a spherical surface having depressions and protrusions; a rotation driving part that is in contact with the spherical surface of the driven member and rotates the driven member; and a supporting member that is fixed to the driven member and supports an operated body. At least either one of a position and an orientation of the operated body is adjusted by rotation of the driven member.

11 Claims, 9 Drawing Sheets

(51) Int. Cl.
*G03B 15/00* (2006.01)
*G03B 17/00* (2006.01)
*H04N 5/222* (2006.01)
*F16H 1/28* (2006.01)
*F16H 19/00* (2006.01)
*B25J 9/10* (2006.01)
*B25J 9/12* (2006.01)
*B25J 17/00* (2006.01)

(52) U.S. Cl.
CPC ............ *G03B 15/00* (2013.01); *G03B 17/00* (2013.01); *G03B 17/56* (2013.01); *H04N 5/222* (2013.01); *B25J 9/102* (2013.01); *B25J 9/12* (2013.01); *B25J 17/00* (2013.01)

(56) References Cited

U.S. PATENT DOCUMENTS

| | | | |
|---|---|---|---|
| 6,353,773 B1 * | 3/2002 | Takenaka | B25J 9/1689 318/568.1 |
| 6,734,914 B1 * | 5/2004 | Nishimura | H04N 5/2251 348/375 |
| 7,365,925 B2 * | 4/2008 | Wayne | G02B 27/62 359/811 |
| 8,767,120 B2 * | 7/2014 | Takizawa | H04N 5/2251 348/208.3 |
| 2010/0073555 A1 | 3/2010 | Li et al. | |
| 2014/0354833 A1 * | 12/2014 | Takizawa | G03B 5/00 348/208.3 |

FOREIGN PATENT DOCUMENTS

| | | |
|---|---|---|
| JP | 10-122809 A | 5/1998 |
| JP | 11-010567 A | 1/1999 |
| JP | 2011-196487 A | 10/2011 |

OTHER PUBLICATIONS

Extended European Search Report dated Jan. 17, 2019 corresponding to European Patent Application No. 16851806.6 (7 pages).

* cited by examiner

MULTIDIRECTIONAL DRIVE DEVICE, AND AUTOMATIC CAMERA

CROSS REFERENCE TO RELATED APPLICATIONS

This application is a national stage application of International Application No. PCT/JP2016/078929 entitled "MULTIDIRECTIONAL DRIVE DEVICE, AND AUTOMATIC CAMERA", filed on Sep. 29, 2016, which claims the benefit of the priority of Japanese Patent Application No. 2015-192976, filed on Sep. 30, 2015, the disclosures of each of which are hereby incorporated by reference in their entirety.

TECHNICAL FIELD

The present invention relates to a multidirectional drive device that is capable of adjusting, in a plurality of degrees of freedom, the position and/or orientation of an operated body such as a camera, a robot arm or the like mounted at the tip end of a supporting member, and an automatic camera.

BACKGROUND ART

There has been known a technique for controlling rotation of an operated body such as a camera, a robot arm or the like by means of an XY stage serving as a driven body.

For example, the multidirectional drive device disclosed in Patent Document 1 includes a driven body, a first driving force transmitting part, and a second driving force transmitting part. The driven body has an XY stage. The first driving force transmitting part is in contact with the surface of the driven body and drives the driven body in a first direction. The second driving force transmitting part is in contact with another portion of the driven body and drives the driven body in a second direction that is different from the first direction.

In the above multidirectional drive device, the driven body and the first driving force transmitting part are mutually displaceable in the tooth trace direction of a gear. Moreover, the driven body and the second driving force transmitting part are mutually displaceable in the tooth trace direction of a gear. As a result, the angle of the driven body mounted on the driven body can be freely adjusted.

PRIOR ART DOCUMENTS

Patent Documents

[Patent Document 1] Japanese Unexamined Patent Application, First Publication No. 2011-196487

SUMMARY OF INVENTION

Problem to be Solved by the Invention

In the multidirectional drive device disclosed in Patent Document 1, the driven body and the first and second driving force transmitting parts are mutually displaced in the tooth trace direction of the gear. This multidirectional drive device makes the driven body movable overall in the first direction or the second direction on the XY stage.

Therefore, in the multidirectional drive device disclosed in Patent Document 1, for example, it is not possible to rotate or move in a third direction (z-axis direction) orthogonal to the first direction or the second direction. In order to achieve displacement in the third direction, it is necessary to add a new mechanism, resulting in a problem that the configuration becomes complicated.

Meanwhile, a gimbal mechanism 90 shown in FIG. 9 is provided as a technique different from Patent Document 1.

This gimbal mechanism 90 is of a configuration in which within an outer frame 91 there is provided an inner frame 92 so as to be rotatable about the z-axis, within the inner frame 92 there is provided a camera supporting member 93 so as to be rotatable about the y-axis, and within the camera supporting member 93 there is provided an operated body (not shown in the figure) so as to be rotatable about the x-axis direction.

However, with this type of gimbal mechanism 90, there is a problem that the movable angle is small, the visual field that can be confirmed by a camera serving as the operated body is limited to a narrow range, and the overall mechanism becomes excessively large and the weight thereof also increases.

The present invention has been made in view of the above circumstances. An exemplary object of the present invention is to provide a multidirectional drive device that is capable of adjusting, in a plurality of degrees of freedom, the position and/or orientation of an operated body by means of a simply configured driving mechanism, and an automatic camera.

Means for Solving the Problem

A multidirectional drive device according to an exemplary aspect of the present invention includes: a driven member that includes a spherical surface having depressions and protrusions; a rotation driving part that is in contact with the spherical surface of the driven member and rotates the driven member; and a supporting member that is fixed to the driven member and supports an operated body. At least either one of a position and an orientation of the operated body is adjusted by rotation of the driven member.

Effect of the Invention

According to an exemplary embodiment of the present invention, it is possible to adjust the position and/or orientation of an operated body.

EMBODIMENTS FOR CARRYING OUT THE INVENTION

Exemplary Embodiment

A multidirectional drive device 100 according to an exemplary embodiment of the present invention will be described, with reference to FIG. 1.

Figure 1:
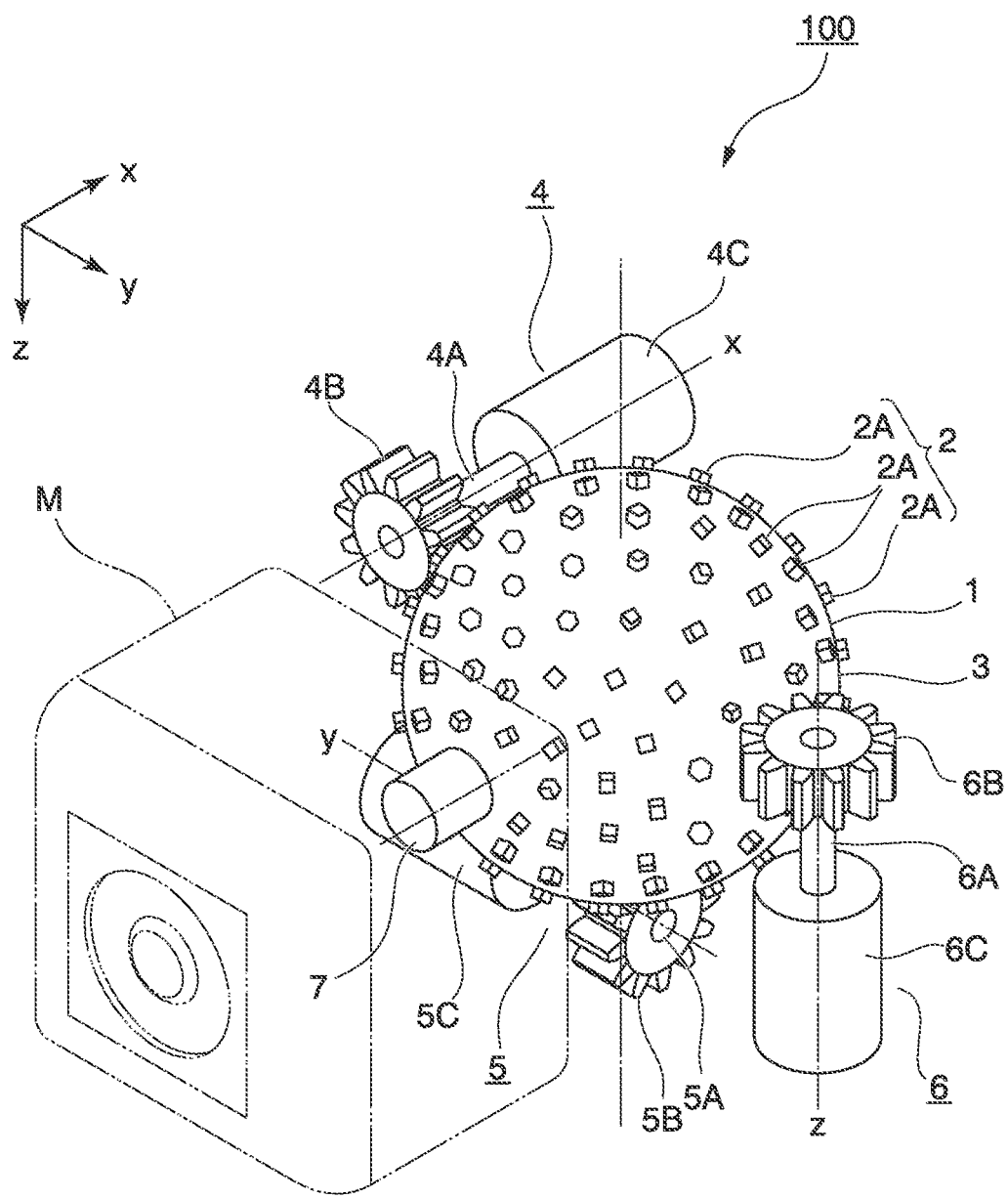
FIG. 1 is a perspective view of a multidirectional drive device according to an exemplary embodiment of the present invention.

FIG. 1 shows a freely rotatable driven member 1. The driven member 1 includes a spherical surface 3 having a depression-protrusion part 2 thereon.

Around the driven member 1 there are provided rotation driving parts 4 to 6 so as to make contact with the depression-protrusion part 2 of the driven member 1 and generate rotational force on the driven member 1. In this exemplary embodiment, there are a plurality of the rotation driving parts 4 to 6, and the rotation driving parts 4 to 6 rotate about the respective x, y, and z axes.

These rotation driving parts 4 to 6 have rotation driving bodies 4B to 6B (for example, gears) that cause the driven member 1 to rotate about the rotation shafts 4A to 6A that are oriented in mutually different directions (directions of the x-axis, the y-axis, and the z-axis orthogonal to each other in the example of the figure).

Specifically, the rotation driving part 4 includes a rotation shaft 4A, a rotation driving body 4B, and a driving motor 4C. The rotation shaft 4A extends along the x-axis. The rotation driving body 4B causes the driven member 1 to rotate about the rotation shaft 4A. The driving motor 4C drives the rotation driving body 4B.

The rotation driving part 5 includes a rotation shaft 5A, a rotation driving body 5B, and a driving motor 5C. The rotation shaft 5A extends along the y-axis. The rotation driving body 5B causes the driven member 1 to rotate about the rotation shaft 5A. The driving motor 5C drives the rotation driving body 5B.

The rotation driving part 6 includes a rotation shaft 6A, a rotation driving body 6B, and a driving motor 6C. The rotation shaft 6A extends along the z-axis. The rotation driving body 6B causes the driven member 1 to rotate about the rotation shaft 6A. The driving motor 6C drives the rotation driving body 6B.

A supporting member 7 is connected to the driven member 1 which is rotated by these rotation driving bodies 4 to 6. The driven member 1 and the supporting member 7 rotate together.

The supporting member 7 in this exemplary embodiment has one end part (first end part, first end) connected to the driven member 1, and an other end part (second end part, second end) to which is connected an operated body M such as a camera, a robot arm, or the like. In the example shown in FIG. 1, the operated body M is a camera. When the driven member 1 is rotated by the rotation driving parts 4 to 6, it is possible to cause the operated body M connected to the other end part of the supporting member 7 to operate and move about the rotation shafts 4A to 6A so as to follow the driven member 1.

As a result, it is possible to freely adjust the position and/or orientation of the operated body M such as a camera, a robot arm, or the like, about the rotation shafts 4A to 6A of the rotation driving parts 4 to 6 within a three-dimensional space.

As described in detail above, the multidirectional drive device 100 shown in the present exemplary embodiment includes the plurality of rotation driving parts 4 to 6 that are in contact with the depression-protrusion part 2 of the driven member 1 to generate rotational force on the driven member 1. The multidirectional drive device 100 causes the driven member 1 to rotate about the rotation shafts 4A to 6A oriented in mutually different directions (x-axis, y-axis, z-axis) by means of these rotation driving parts 4 to 6.

By individually driving these rotation driving parts 4 to 6, it is possible to adjust, in a plurality of degrees of freedom, the position and/or orientation of the operated body M at the tip end of the supporting member 7 that is connected to one end part of the driven member 1.

That is to say, in the multidirectional drive device 100 shown in the present exemplary embodiment, by means of the simple configuration in which there are provided the plurality of rotation driving parts 4 to 6 that rotate the spherical driven member 1 about the rotation shafts 4A to 6A oriented in mutually different directions, it is possible in a plurality of degrees of freedom within a three-dimensional space to adjust the position and/or orientation of the operated body M at the tip end of the supporting member 7 extending outward from the driven member 1.

The plurality of rotation driving parts 4 to 6 mentioned above have rotation driving bodies 4B to 6B which rotate about the three rotation shafts 4A to 6A having the x-axis, y-axis, and z-axis which are oriented in mutually intersecting directions. It is preferable that the x-axis, the y-axis, and the z-axis are oriented in directions mutually orthogonal to each other.

It is preferable that the protrusion parts 2A of the depression-protrusion part 2 formed on the spherical surface 3 of the driven member 1 are provided in a grid pattern in a front view and are spaced apart from each other along directions crossing or orthogonal to each other, and the rotation driving bodies of the rotation driving parts 4 to 6 mesh with the driven member 1 to generate rotational force on the driven member 1.

First Exemplary Embodiment

A multidirectional drive device 101 according to a first exemplary embodiment of the present invention will be described, with reference to FIG. 2 to FIG. 7.

Figure 2:
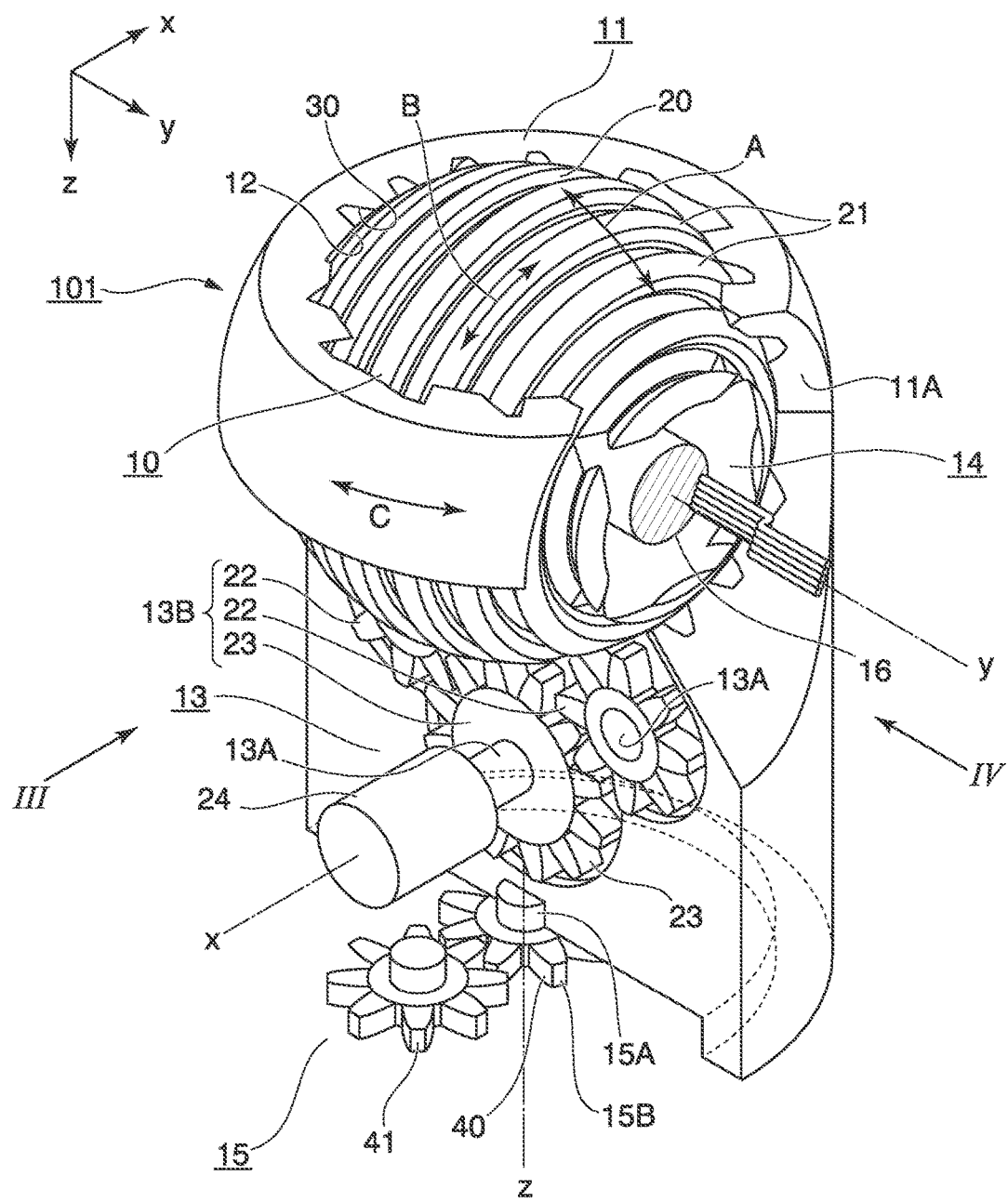
FIG. 2 is a perspective view of a multidirectional drive device according to a first exemplary embodiment of the present invention.

FIG. 2 has a driven member 10 having a spherical shape as a whole. The driven member 10 is rotatably disposed inside a concave spherical surface 12 of a holder 11. The concave spherical surface 12 is a spherical surface provided with depressions.

Around the driven member 10 there are provided a plurality of rotation driving parts 13 to 15 for generating rotational force on the driven member 10.

These rotation driving parts 13 to 15 have rotation driving bodies 13B to 15B that cause the driven member 10 to rotate about the rotation shafts 13A to 15A that are oriented in mutually different directions (the x-axis, the y-axis, and the z-axis. The x, y, and z axes are oriented in directions intersecting with or orthogonal to each other. The rotation driving bodies 13B to 15B rotate about the rotation shafts 13A to 15A, respectively, thereby rotating the driven member 10.

Figure 3A:
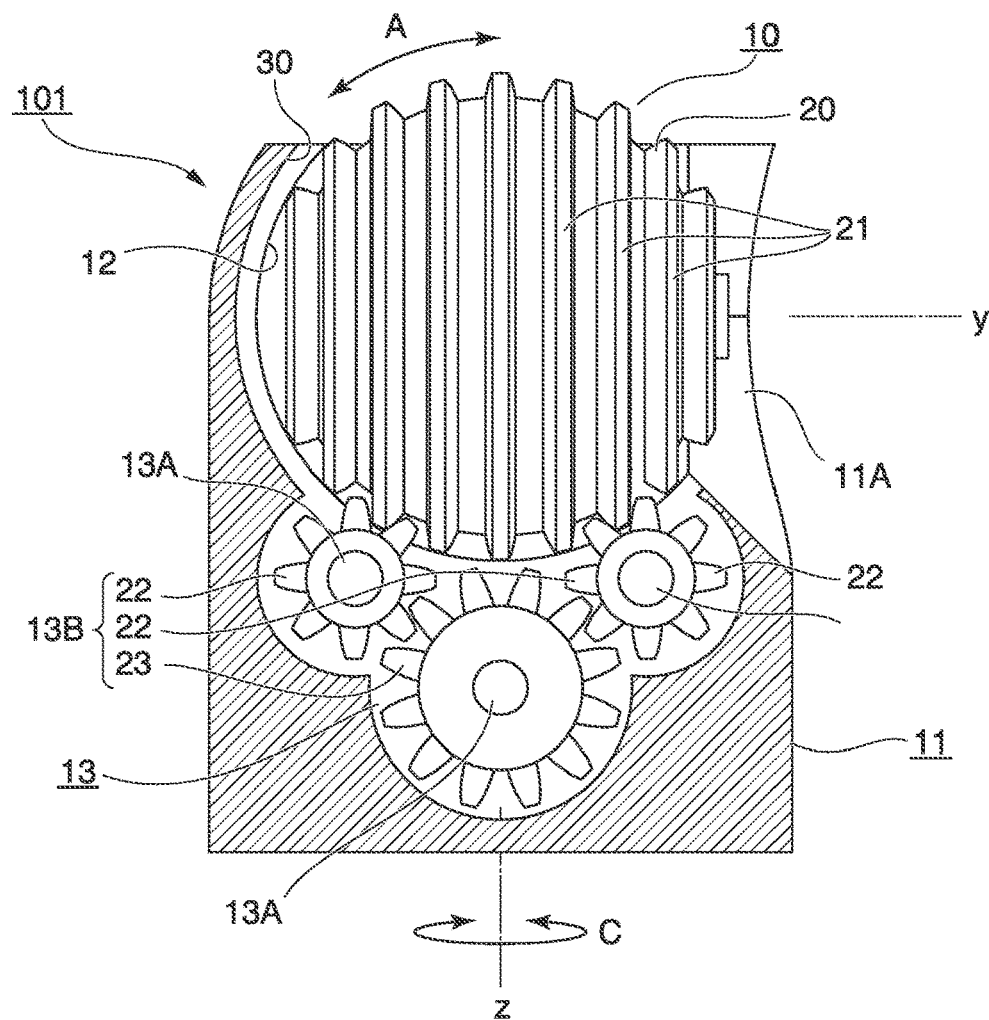
FIG. 3A is a cross-sectional view of the multidirectional drive device shown in FIG. 2 as viewed from the III direction.
Figure 3B:
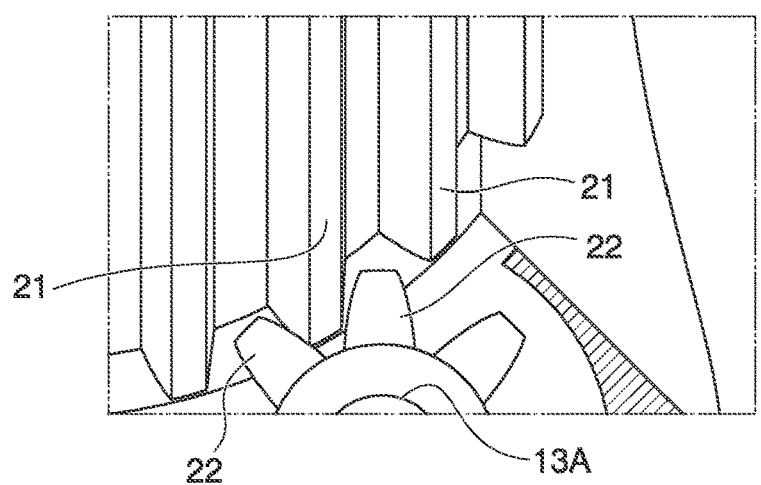
FIG. 3B is an enlarged view of a meshing part of the gears shown in FIG. 3A.

Specifically, as shown in FIGS. 3A and 3B, the rotation driving part 13 is arranged inside the holder 11 (in the lower part in FIG. 3A). The rotation driving body 13B has a pair of gears 22 and a driving gear 23. On the spherical surface 20 of the driven member 10 there is provided a depression-protrusion part 21 having depressions and protrusions. The pair of gears 22 mesh with the depression-protrusion part 21 and rotate about the rotation shafts 13A. The rotation shafts 13A extend along the x-axis. The driving gear 23 meshes with the gears 22 and drives the gears 22 to rotate.

The depression-protrusion part 21 of the driven member 10 has a teeth shape that is in smooth contact with the depression-protrusion part of the holder 11. The driven member 10 is of a three-dimensional structure in which a gear having no tips beyond the pitch circle is rotated about the y-axis. That is to say, the spherical surface 20 of the driven member 10 has a three-dimensional structure that matches the trajectory obtained by rotating a spur gear, whose tip ends do not exceed the pitch circle, about an axis parallel to the y-axis. In other words, the driven member 10 has an outer circumference along the trajectory that is obtained by rotating about the y-axis, the outline on a plane including the y-axis along the outer shape of the gear formed in a shape having the tip ends of the teeth positioned along the pitch circle. The driven member 10 is driven to rotate in the directions of the arrows A about the x-axis by the gears 22 of the rotation driving body 13B that mesh with the driven member 10 (refer to FIG. 2, FIG. 3A, and FIG. 3B). The driving gear 23 for driving the gears 22 is connected to a driving motor 24 as a drive source as shown in FIG. 2. That is to say, the depression-protrusion part 21 in this exemplary embodiment has a configuration such that a plurality of concentric protrusions (or grooves) centered on one axis (y-axis) of the spherical surface 20 are provided along the direction of this one axis at mutual intervals according to the pitch of the gears 22 of the rotation driving parts 13 and 14.

With the above configuration, when the driving gear 23 is driven by the driving motor 24 and the driven gears 22 are driven to rotate together with the driving gear 23, the driven member 10 in the holder 11 rotates in the directions of the arrows A (refer to FIG. 2, FIG. 3A, and FIG. 3B).

Figure 4A:
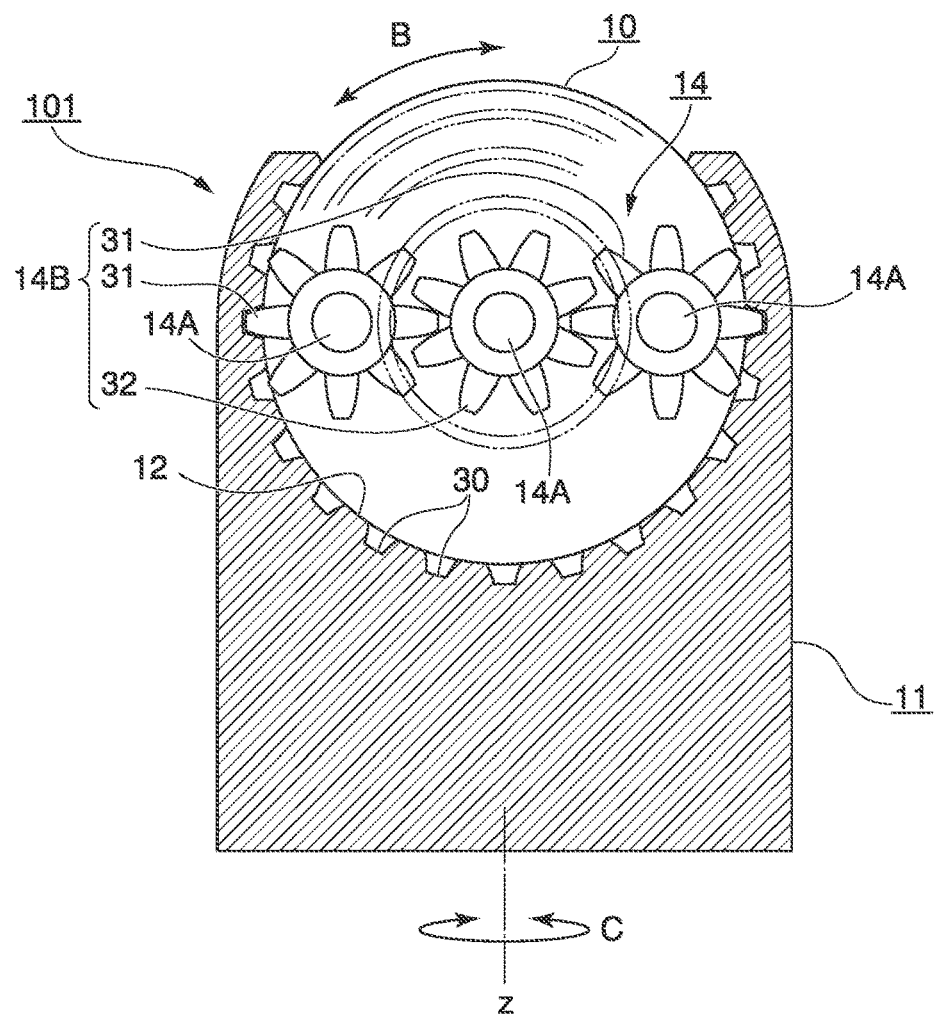
FIG. 4A is a cross-sectional view of the multidirectional drive device shown in FIG. 2 as viewed from the IV direction.
Figure 4B:
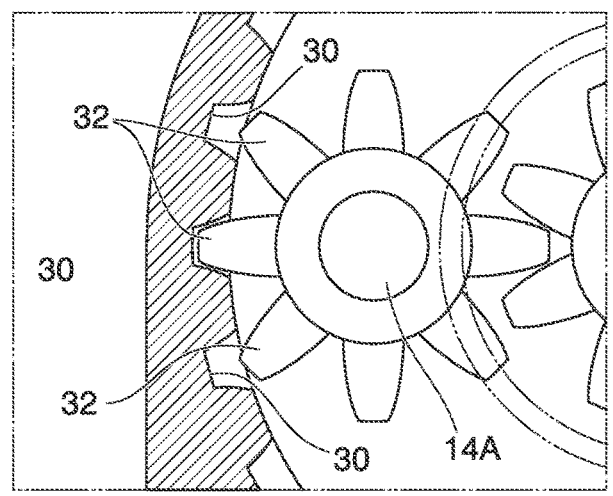
FIG. 4B is an enlarged view of a meshing portion of the gears shown in FIG. 4B.

The rotation driving part 14 is arranged inside the spherical driven member 10 as shown in FIG. 4A and FIG. 4B. The rotation driving body 14B has a pair of gears 31 and a driving gear 32. The pair of gears 31 mesh with the depression-protrusion part 30 formed in the concave spherical surface 12 of the holder 11, and rotate about the rotation shafts 14A. The rotation shafts 14A extend along the y-axis. The rotation shafts 14A of the driving gears 31 are not fixed to the driven member 10. As shown in FIG. 4A and FIG. 4B, the driven member 10 has two through holes for the teeth of the two gears 31 to protrude to the outside (the through holes are omitted in FIG. 2 and so forth). The length of the through hole in the direction of the arrows B may be the same as the length that connects three of the depressions and two of the protrusions constituting the depression-protrusion part 30, for example. The driving gear 32 meshes with the gears 31 and drives the gears 31 to rotate.

The depression-protrusion part 30 formed in the concave spherical surface 12 of the holder 11 is of a three-dimensional structure in which an internal gear cut on the teeth pitch arc is rotated about the x-axis. That is to say, the spherical surface 12 of the holder 11 has a three-dimensional structure that matches the trajectory obtained by rotating the internal gear, whose tip end does not exceed the pitch circle, about an axis parallel to the x-axis. In other words, the holder 11 has a shape formed along the trajectory that is obtained by rotating about the x-axis, the outline on a plane including the y-axis along the outer diameter of the internal gear formed in a shape having the tip ends of the teeth positioned along the pitch circle. The gears 31 mesh with the holder 11. Accordingly, as the gear 32 rotates, the gears 31 rotate in the directions of the arrows B (refer to FIG. 2, FIG. 4A, and FIG. 4B) about the y-axis with respect to the holder 11. The rotation shaft 14A of the driving gear 31 is not fixed to the driven member 10. Accordingly, as the gears 31 of the rotation driving body 14B rotate, the driven member 10 rotates in the directions of the arrows B (refer to FIG. 2, FIG. 4A, and FIG. 4B) about the y-axis with respect to the holder 11. The driving gear 32 for driving the gears 31 is connected to a driving motor (not shown in the figure).

With the above configuration, when the driving gear 32 is driven by the driving motor and the driven gears 31 are driven to rotate together with the driving gear 32, the driven member 10 in the holder 11 rotates in the directions of the arrows B (refer to FIG. 2, FIG. 3A, and FIG. 4B).

As shown in FIG. 2, the rotation driving part 15 is disposed below the holder 11. The rotation driving part 15 has a pair of a gear 40 and a driving gear 41. The pair of gears 40 rotate about the rotation shaft 15A. The rotation shaft 15A is provided along the z-axis. The rotation shaft 15A is fixed to the lower surface of the holder 11. Therefore, as the rotation shaft 15A rotates in the directions of the arrows C (refer to FIG. 2 to FIG. 4B), the holder 11 rotates in the directions of the arrows C. The driving gear 41 meshes with the gear 40 and drives the gear 40 to rotate. A driving motor (not shown in the figure) serving as a power source is connected to the driving gear 41.

With the above configuration, when the gear 40 as well as the driving gear 41 are driven by the driving motor (not shown in the figure), the driven member 10 in the holder 11 rotates together with the holder 11 in the directions of the arrows C (refer to FIG. 2 to FIG. 4B).

Figure 5:
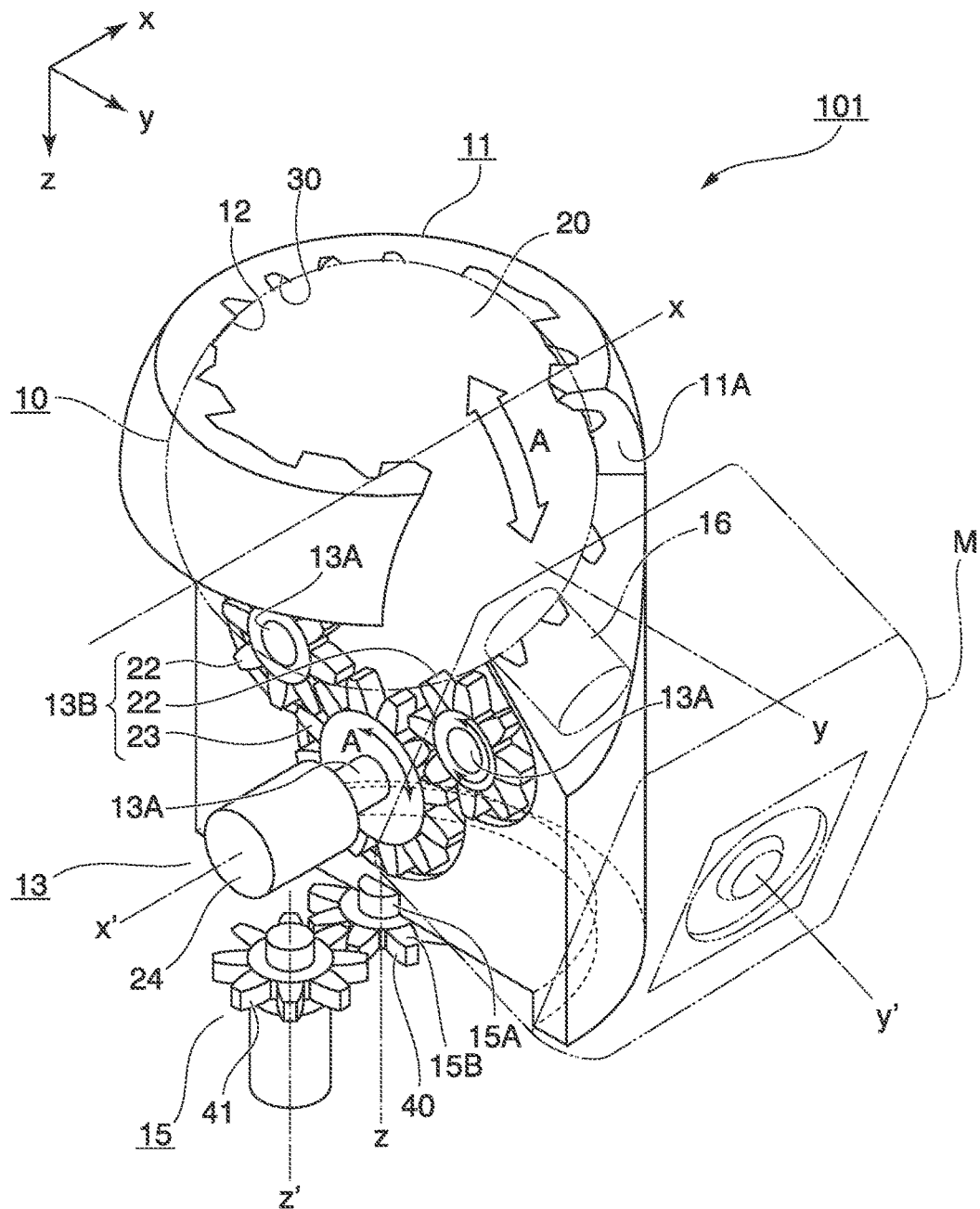
FIG. 5 is a perspective view showing a state where the driven member of the multidirectional drive device shown in FIG. 2 is rotated in the directions of the arrows A.
Figure 6:
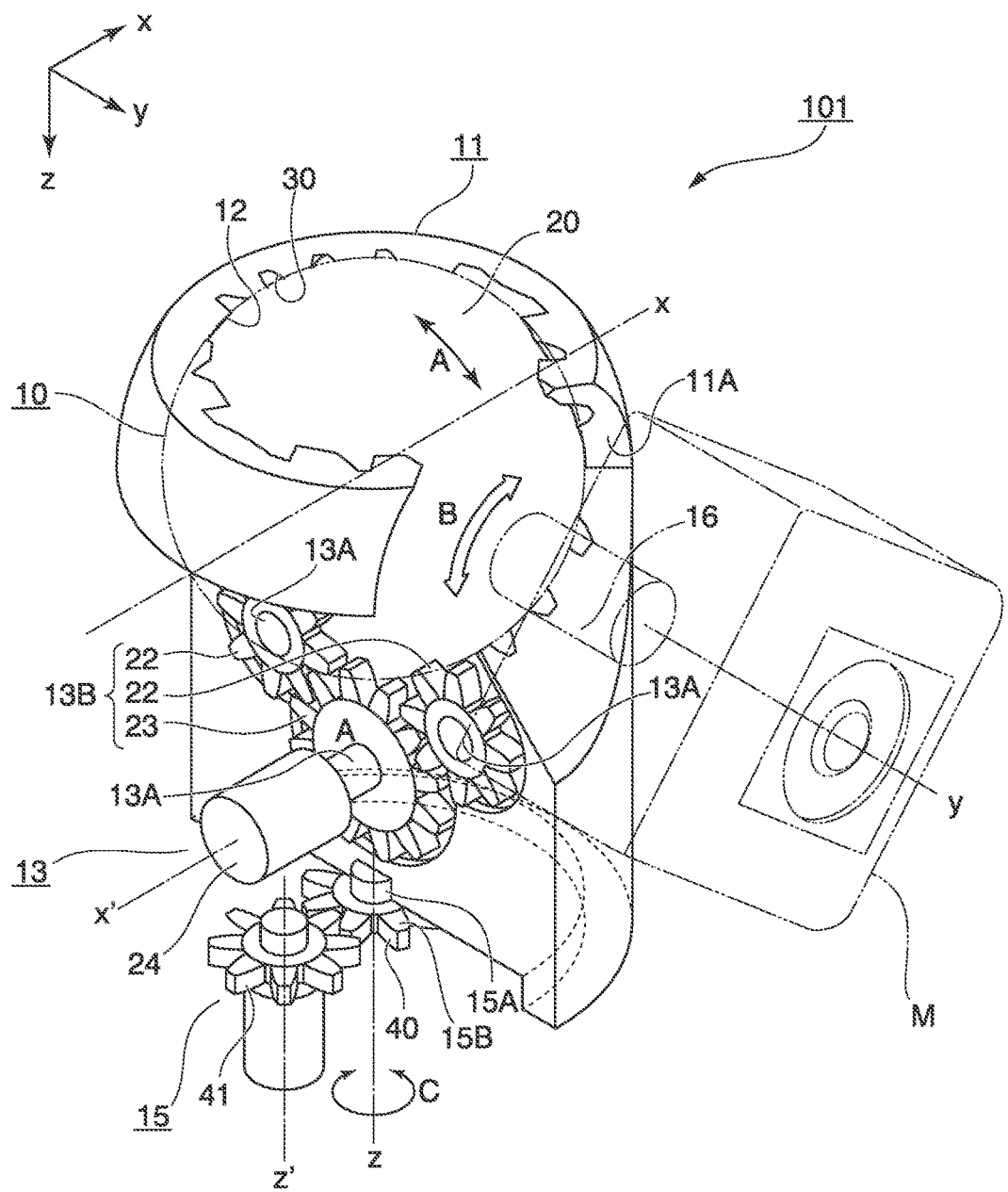
FIG. 6 is a perspective view showing a state where the driven member of the multidirectional drive device shown in FIG. 2 is rotated in the directions of the arrows B.
Figure 7:
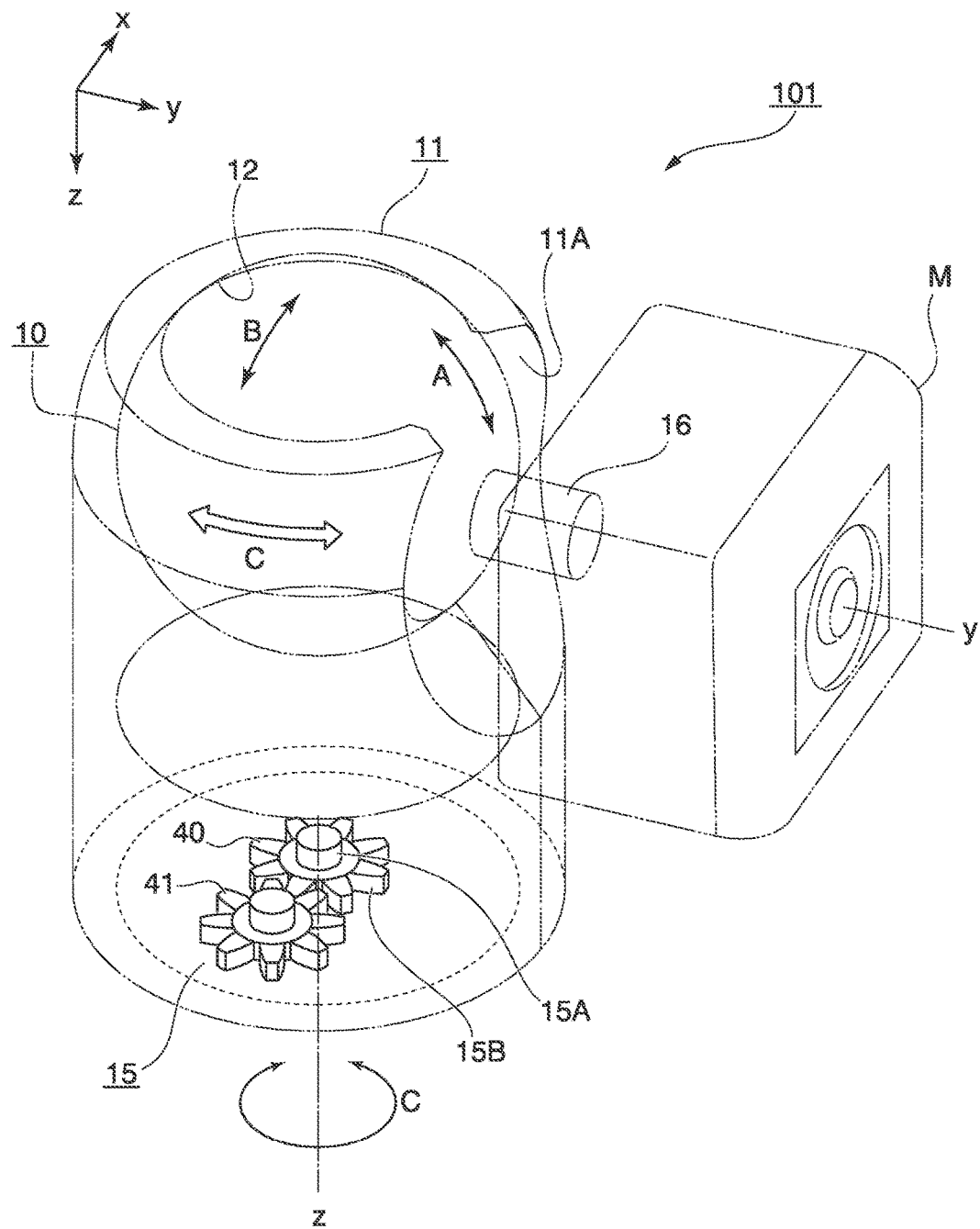
FIG. 7 is a perspective view showing a state where the driven member of the multidirectional drive device shown in FIG. 2 is rotated in the directions of the arrows C.

A supporting member 16 is connected to the driven member 10 as shown in FIG. 5 to FIG. 7.

The supporting member 16 has one end part connected to the driven member 10, and an other end part to which is connected an operated body M such as a camera, a robot arm, or the like. When the driven member 10 is rotated by the rotation driving parts 13 to 15, it causes the operated body M connected to the other end part of the supporting member 16 to operate and move about the rotation shafts (x-axis, y-axis, and z-axis) so as to follow the driven member 10.

The mounting position of the driven member 10 on which the supporting member 16 is disposed is a portion (denoted by reference symbol 11A, hereinafter referred to as cutaway part 11A) where the surface of the driven member 10 is exposed as a result of cutting out a part of the holder 11. The operated body M at the tip end of the supporting member 16 is operated through the cutaway part 11A of the holder 11.

In the multidirectional drive device 101, the rotation driving body 13B is driven by the rotation driving part 13 about the x-axis. That is to say, the rotation driving part 13 drives the rotation driving body 13B about the x-axis. In this case, the driven member 10 meshed with the rotation driving body 13B is driven to rotate in the directions of arrows A. In conjunction therewith, the operated body M connected to the driven member 10 is also driven to rotate in the directions of the arrows A (refer to FIG. 5). Here, the axis line of the rotation driving part 14 after rotating in the directions of the arrows A is indicated by y'.

The rotation driving body 14B is driven by the rotation driving part 14 about the y-axis. That is to say, the rotation driving part 14 drives the rotation driving body 14B about the y-axis. In this case, the driven member 10 meshed with the rotation driving body 14B is driven to rotate in the directions of arrows B. In conjunction therewith, the operated body M connected to the driven member 10 is also driven to rotate in the directions of the arrows B (refer to FIG. 6).

The rotation driving body 15B is driven by the rotation driving part 15 about the z-axis. That is to say, the rotation driving part 15 drives the rotation driving body 15B about the z-axis. In this case, the holder 11 meshed with the rotation driving body 15B is driven to rotate in the directions of the arrows C, and in conjunction therewith, the operated body M connected to the driven member 10 in the holder 11 is also driven to rotate in the directions of the arrows C (refer to FIG. 7).

As described above, the driven member 10 is driven to rotate individually about the x-axis, the y-axis, and the z-axis by the rotation driving parts 13 to 15, whereby it is possible to adjust, in a plurality of degrees of freedom, the position and/or orientation of the operated body M connected to the driven member 10.

As described in detail above, according to the multidirectional drive device 101 of the present exemplary embodiment, there are included the depression-protrusion part 21 of the driven member 10, the depression-protrusion part 30 of the holder 11, and the plurality of rotation driving parts 13 to 15 that are in contact with the lower surface of the holder 11 and that generate rotational force on the driven member 10. The driven member 10 is rotated about the rotation axes oriented in mutually different directions (x-axis, y-axis, z-axis) by means of these rotation driving parts 13 to 15.

By individually driving these rotation driving parts 13 to 15, it is possible to adjust, in a plurality of degrees of freedom, the position and/or orientation of the operated body M at the tip end of the supporting member 16 that is connected to one end part of the driven member 10.

That is to say, the multidirectional drive device 101 according to the present exemplary embodiment includes the plurality of rotation driving parts 13 to 15 that rotate the spherical driven member 10 about the rotation shafts (x-axis, y-axis, z-axis) oriented in mutually different directions. With this simple configuration, it is possible in a plurality of degrees of freedom within a three-dimensional space to adjust the position and/or orientation of the operated body M at the tip end of the supporting member 16 extending outward from the driven member 10. In the case where the operated body M is a camera and the camera is provided with its optical axis aligned with the y-axis, it is possible to operate the image-capturing direction of the camera with two degrees of freedom about the x-axis and the z-axis, and adjust the orientation (top and bottom) of an image by means of rotation about the y-axis.

The plurality of rotation driving parts 13 to 15 mentioned above have rotation driving bodies 13B to 15B which rotate about the three rotation shafts 13A to 15A having the x-axis, y-axis, and z-axis which are oriented in mutually intersecting directions. It is preferable that the x-axis, the y-axis, and the z-axis are oriented in directions mutually orthogonal to each other.

Figure 8:
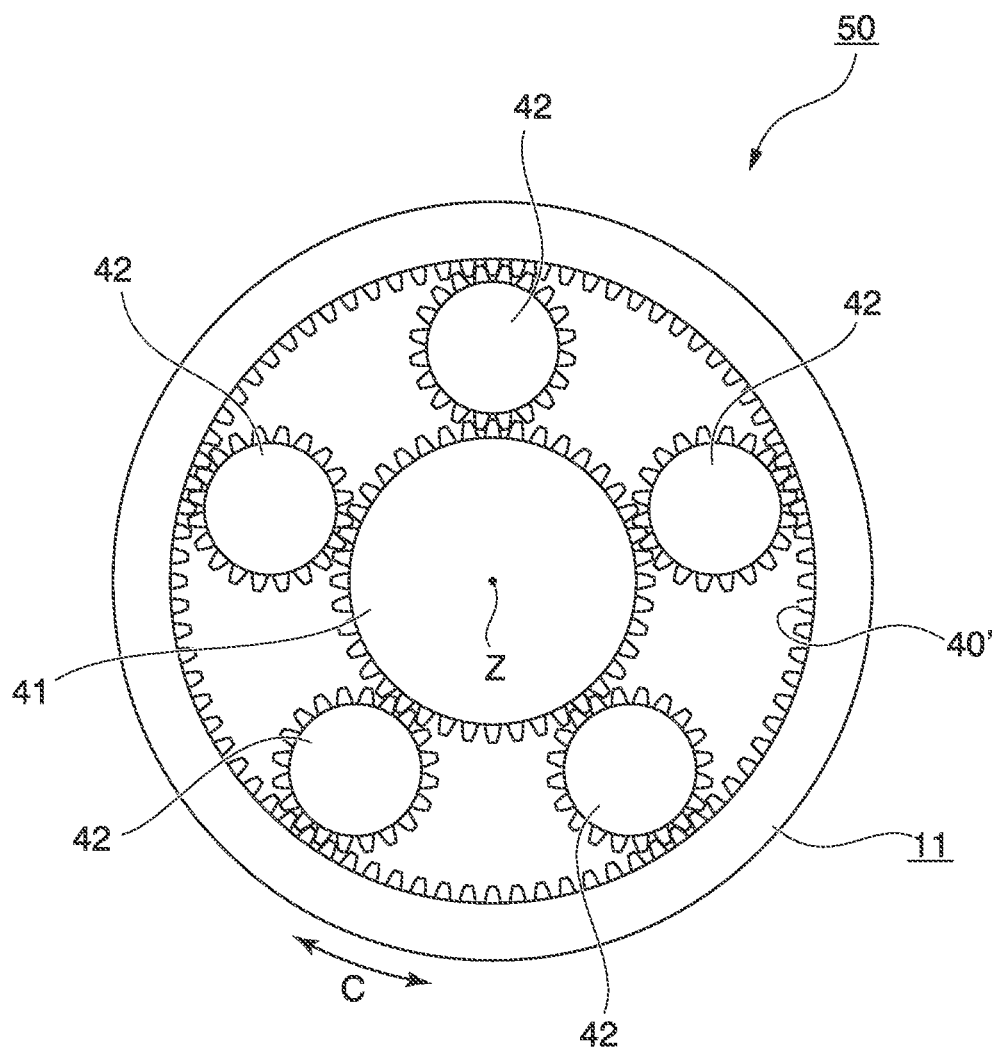
FIG. 8 is a plan view showing a planetary gear mechanism used as a rotation driving part of the multidirectional drive device shown in FIG. 2.
Figure 9:
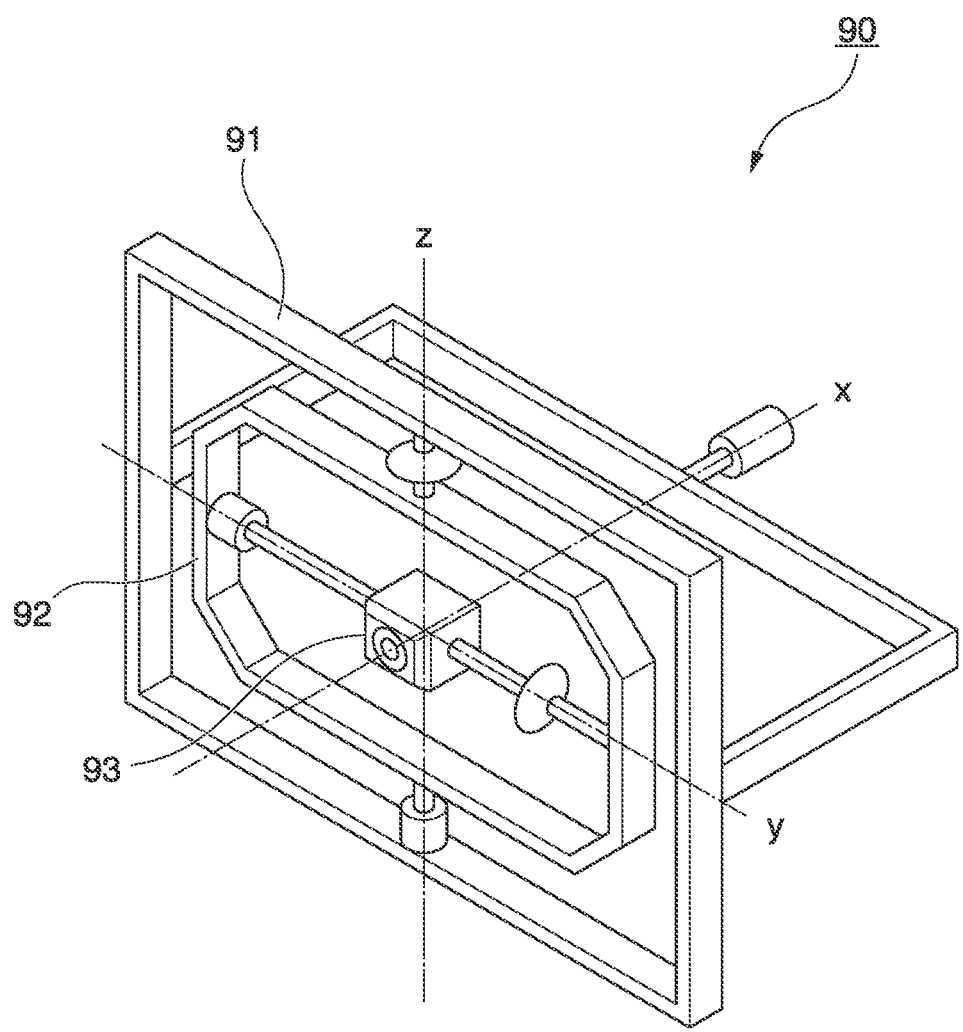
FIG. 9 is a perspective view showing a general gimbal mechanism.

In the above description, there has been described the case where the rotation driving part 15 for rotating the driven member 10 about the z-axis is configured with the driving gear 41 and the driven gear 40. However, the configuration for driving the driven member 10 to rotate about the z-axis is not limited to the above example. For example, there may be employed the configuration shown in FIG. 8 in which the driven member 10 is driven to rotate about the z-axis. In the configuration shown in FIG. 8, a planetary gear mechanism 50 is used as a rotation driving part. The planetary gear mechanism 50 has a driving gear 41, a driven gear 40', and a plurality of planetary gears 42. A rotational force about the z-axis is applied to the driving gear 41. The driven gear 40' is provided on the inner circumferential surface of the cylindrical body of the holder 11 and has a ring shape. The planetary gears 42 are interposed between the driven gear 40' and the driving gear 41.

In the exemplary embodiment of the present invention, there is used the configuration having the three rotation driving bodies 13 to 15 including the rotation driving body 13 that meshes with the depression-protrusion part 21 formed on the spherical surface 20 of the driven member 10 to drive the driven member 10.

In the exemplary embodiment shown in FIGS. 2 to 7, only the rotation driving body 13 meshes with the depression-protrusion part 21 formed on the entire surface of the spherical surface 20 of the driven member 10. However, it is not limited to this type of exemplary embodiment. In another exemplary embodiment, for example, a plurality of depression-protrusion parts may be appropriately provided for each direction, such as a depression-protrusion part 21 for x-axis rotation, a depression-protrusion part 21 for y-axis rotation, and a depression-protrusion part 21 for z-axis rotation, and rotation driving parts that mesh with these depression-protrusion parts may be provided.

In this case, the rotation driving part other than the rotation driving parts that mesh with the depression-protrusion parts may appropriately employ the configurations shown with the rotation driving bodies 14 and 15. Further, the length, the attachment angle, and the attachment position of the supporting member 16 are not limited to the above exemplary embodiments, and may be different depending on the function and use of the operated body M.

The exemplary embodiments of the present invention have been described in detail with reference to the figures. However, specific configurations are not limited to these exemplary embodiments, and design changes and the like within a scope not deviating from the gist of the present invention are included.

Some or all of the above exemplary embodiments may also be described as follows, but are not limited to the following.

Supplementary Note 1

A multidirectional drive device comprising:
a driven member that comprises a spherical surface having depressions and protrusions;
a rotation driving part that is in contact with the spherical surface of the driven member and rotates the driven member; and
a supporting member that is fixed to the driven member and supports an operated body,
wherein at least either one of a position and an orientation of the operated body is adjusted by rotation of the driven member.

Supplementary Note 2

The multidirectional drive device according to supplementary note 1, wherein the supporting member comprises a first end part connected to the driven member and a second end part connected to the operated body.

Supplementary Note 3

The multidirectional drive device according to supplementary note 1 or 2, wherein the rotation driving part comprises a plurality of rotation driving parts that respectively rotate the driven member in different directions, and the position and the orientation of the driven body are adjusted by rotation of the driven member.

Supplementary Note 4

The multidirectional drive device according to supplementary note 3, wherein the plurality of rotation driving parts comprise rotation driving bodies that rotate about three rotation axes intersecting with each other.

Supplementary Note 5

The multidirectional drive device according to supplementary note 4, wherein the three rotation axes are orthogonal to each other.

Supplementary Note 6

The multidirectional drive device according to supplementary note 4 or 5, wherein the three rotation axes are an x-axis, a y-axis, and a z-axis.

Supplementary Note 7

The multidirectional drive device according to any one of supplementary notes 1 to 6, wherein the spherical surface of the driven member has a depression and a protrusion, the depression having a ring shape, and the protrusion being provided in parallel with the depression and having a ring shape.

Supplementary Note 8

The multidirectional drive device according to supplementary note 1 or 2, wherein the rotation driving part comprises a gear.

Supplementary Note 9

The multidirectional drive device according to supplementary note 1 or 2, further comprising:
a holder that rotatably supports the driven member and has a spherical surface having depressions and protrusions,
wherein the rotation driving part comprises first to third rotation driving parts,
the first rotation driving part is disposed inside the holder, the first rotation driving part being in contact with the spherical surface of the driven member and rotating the driven member about a first axis,
the second rotation driving part is disposed inside the driven member, the second rotation driving part being in contact with the spherical surface of the holder and rotating the driven member about a second axis that intersects with the first axis, and
the third rotation driving part rotates the holder to rotate the driven member about a third axis that intersects with the first and second axes.

Supplementary Note 10

The multidirectional drive device according to supplementary note 9,
wherein the spherical surface of the driven member comprises a three-dimensional structure that matches with a trajectory obtained by rotating a spur gear about an axis parallel to the second axis, the spur gear having a tip end that does not exceed a pitch circle thereof,
the spherical surface of the driven member has a depression and a protrusion, the depression having a ring shape, and the protrusion being provided in parallel with the depression and having a ring shape, and
the spherical surface of the driven member meshes with the first rotation driving part.

Supplementary Note 11

The multidirectional drive device according to supplementary note 9 or 10,
wherein the spherical surface of the holder comprises a three-dimensional structure that matches with a trajectory obtained by rotating an internal gear about an axis parallel to the first axis, the internal gear having a tip end that does not exceed a pitch circle thereof, and
the spherical surface of the holder has a depression and a protrusion, the depression having a ring shape, and the protrusion being provided in parallel with the depression and having a ring shape, and
the spherical surface of the holder meshes with the second rotation driving part.

Supplementary Note 12

The multidirectional drive device according to any one of supplementary notes 9 to 11, wherein the third rotation driving part comprises a driving gear and a driven gear, the driving gear applying a rotational force, and the driven gear being integrally fixed to the holder and rotating the holder by meshing with the driving gear.

Supplementary Note 13

The multidirectional drive device according to any one of supplementary notes 9 to 11, wherein the third rotation driving part is configured with a planetary gear mechanism.

Supplementary Note 14

An automatic camera comprising:
the multidirectional drive device according to any one of supplementary notes 1 to 13; and
a camera being the supporting member.
This application is based upon and claims the benefit of priority from Japanese patent application No. 2015-192976, filed Sep. 30, 2015, the disclosure of which is incorporated herein in its entirety by reference.

INDUSTRIAL APPLICABILITY

The exemplary embodiment of the present invention relates to a multidirectional drive device that is capable of adjusting, in a plurality of degrees of freedom, the position and/or orientation of an operated body such as a camera, a robot arm or the like mounted at the tip end of a supporting member, by means of a simple method.

REFERENCE SYMBOLS

1 Driven member
2 Depression-protrusion part
3 Spherical surface
4 Rotation driving part
4A Rotation shaft
4B Rotation driving body
5 Rotation driving part
5A Rotation shaft
5B Rotation driving body
6 Rotation driving part
6A Rotation shaft
6B Rotation driving body
7 Supporting member
10 Driven member
11 Holder
12 Concave spherical surface
13 Rotation driving part
13A Rotation shaft
13B Rotation driving body
14 Rotation driving part
14A Rotation shaft
14B Rotation driving body
15 Rotation driving part
15A Rotation shaft
15B Rotation driving body
16 Supporting member
20 Spherical surface
21 Depression-protrusion part
22 Gear
23 Driving gear
30 Depression-protrusion part
31 Gear
32 Driving gear
40 Gear
41 Driving gear
50 Planetary gear mechanism
100 Multidirectional drive device
101 Multidirectional drive device
M Operated body

The invention claimed is:

1. A multidirectional drive device comprising:
a driven member that comprises a spherical surface having depressions and protrusions;
a rotation driving part that is in contact with the spherical surface of the driven member and rotates the driven member; and
a supporting member that is fixed to the driven member and supports an operated body,
wherein at least either one of a position and an orientation of the operated body is adjusted by rotation of the driven member,
wherein the rotation driving part comprises a plurality of rotation driving parts that respectively rotate the driven member in different directions, and
the position and the orientation of the operated body are adjusted by rotation of the driven member,
wherein the plurality of rotation driving parts comprise rotation driving bodies that rotate about three rotation axes intersecting with each other, and
wherein the three rotation axes are an x-axis, a y-axis, and a z-axis.

2. The multidirectional drive device according to claim 1, wherein the supporting member comprises a first end part connected to the driven member and a second end part connected to the operated body.

3. The multidirectional drive device according to claim 1, wherein the three rotation axes are orthogonal to each other.

4. The multidirectional drive device according to claim 1, wherein the rotation driving part comprises a gear.

5. An automatic camera comprising:
the multidirectional drive device according to claim 1; and
a camera being the supporting member.

6. A multidirectional drive device comprising:
a driven member that comprises a spherical surface having depressions and protrusions;
a rotation driving part that is in contact with the spherical surface of the driven member and rotates the driven member; and
a supporting member that is fixed to the driven member and supports an operated body,
wherein at least either one of a position and an orientation of the operated body is adjusted by rotation of the driven member, and
wherein the spherical surface of the driven member has a depression and a protrusion, the depression having a ring shape, and the protrusion being provided in parallel with the depression and having a ring shape.

7. A multidirectional drive device comprising:
a driven member that comprises a spherical surface having depressions and protrusions;
a rotation driving part that is in contact with the spherical surface of the driven member and rotates the driven member;
a supporting member that is fixed to the driven member and supports an operated body; and
a holder that rotatably supports the driven member and has a spherical surface having depressions and protrusions,
wherein at least either one of a position and an orientation of the operated body is adjusted by rotation of the driven member, and
wherein the rotation driving part comprises first to third rotation driving parts,
the first rotation driving part is disposed inside the holder, the first rotation driving part being in contact with the spherical surface of the driven member and rotating the driven member about a first axis,
the second rotation driving part is disposed inside the driven member, the second rotation driving part being in contact with the spherical surface of the holder and rotating the driven member about a second axis that intersects with the first axis, and
the third rotation driving part rotates the holder to rotate the driven member about a third axis that intersects with the first and second axes.

8. The multidirectional drive device according to claim 7, wherein the spherical surface of the driven member comprises a three-dimensional structure that matches with a trajectory obtained by rotating a spur gear about an axis parallel to the second axis, the spur gear having a tip end that does not exceed a pitch circle thereof,
the spherical surface of the driven member has a depression and a protrusion, the depression having a ring shape, and the protrusion being provided in parallel with the depression and having a ring shape, and
the spherical surface of the driven member meshes with the first rotation driving part.

9. The multidirectional drive device according to claim 7, wherein the spherical surface of the holder comprises a three-dimensional structure that matches with a trajectory obtained by rotating an internal gear about an axis parallel to the first axis, the internal gear having a tip end that does not exceed a pitch circle thereof, and the spherical surface of the holder has a depression and a protrusion, the depression having a ring shape, and the protrusion being provided in parallel with the depression and having a ring shape, and the spherical surface of the holder meshes with the second rotation driving part.

10. The multidirectional drive device according to claim 7, wherein the third rotation driving part comprises a driving gear and a driven gear, the driving gear applying a rotational force, and the driven gear being integrally fixed to the holder and rotating the holder by meshing with the driving gear.

11. The multidirectional drive device according to claim 7, wherein the third rotation driving part is configured with a planetary gear mechanism.

* * * * *